April 9, 1968
L. E. CARR
3,376,958
HYDRAULIC DAMPENING DEVICE
Filed April 27, 1965
2 Sheets-Sheet 1
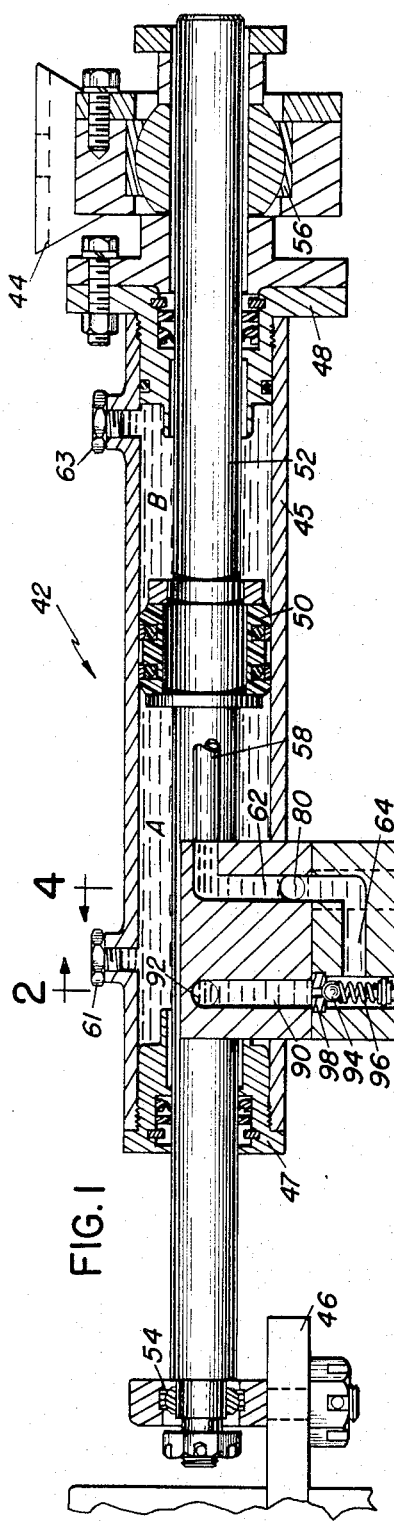
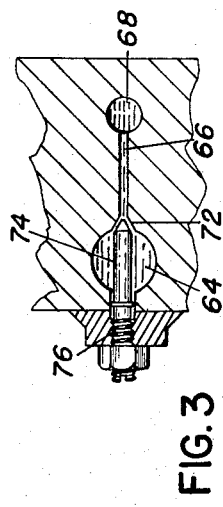
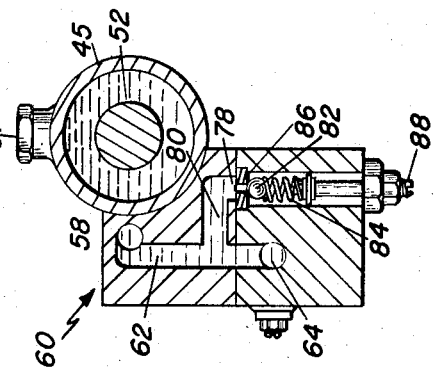
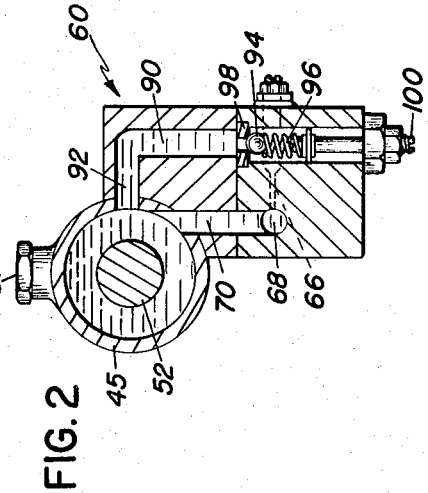
INVENTOR
LOUIS E. CARR
BY
RONALD C. KAMP
ATTORNEY April 9, 1968 L. E. CARR 3,376,958
HYDRAULIC DAMPENING DEVICE
Filed April 27, 1965 2 Sheets-Sheet 2

INVENTOR
LOUIS E. CARR
BY
RONALD C. KAMP
ATTORNEY

United States Patent Office 3,376,958
Patented Apr. 9, 1968

3,376,958
HYDRAULIC DAMPENING DEVICE
Louis E. Carr, Peoria, Ill., assignor to Westinghouse Air Brake Company, a corporation of Pennsylvania
Filed Apr. 27, 1965, Ser. No. 451,174
2 Claims. (Cl. 188—97)

ABSTRACT OF THE DISCLOSURE

A damping jack assembly, as for reducing hunting of a rail vehicle truck, for damping the relative approach and recession of two elements dependent upon the rate of extension or collapse. The jack assembly includes a pair of fluid chambers placed in fluid communication by a first passageway having an adjustable restriction therein. Second and third passageways, each having a spring-loaded check valve therein, are in direct fluid communication with the first passageway for receiving flow therefrom.

---

The present invention relates to damping devices generally and, more particularly, to damping devices wherein the degree of damping is dependent upon the rate of extension or collapse, i.e., the velocity of approach or recession of the elements controlled thereby.

There are many applications which require that two elements be controlled in their movement toward or away from each other. Often it is desirable to resist or impede such movements when the velocities are low, but to freely permit them when the velocities are relatively high, such as the problem encountered in eliminating "hunting" in a rail vehicle, as disclosed by Eaton et al. in co-pending application Ser. No. 451,173 filed concurrently with this application.

It is, therefore, an object of this invention to provide an improved damping device which will damp or resist displacements in either approach or recession when the velocities are low, but will freely permit such displacements when the velocities are high.

It is also an object of this invention to provide an improved damping device wherein the degree of damping, i.e., the amount of resistance, can be selectively and readily adjusted.

It is another object of this invention to provide such a damping device wherein the velocity above which free movement is permitted can be predetermined and selectively adjusted, and wherein the aforementioned velocity for approach and recession can be selected and adjusted independently of each other.

These and other objects and many of the attendant advantages of the present invention will become more readily apparent from a perusal of the following description and the accompanying drawing wherein:

FIG. 1 is a longitudinal cross-sectional view of a preferred embodiment of the present invention;

FIG. 2 is a cross-sectional view taken on line 2—2 of FIG. 1,

FIG. 3 is a cross-sectional view, with portions broken away, taken on a plane through the valve block transverse to the cylinder and showing the needle valve.

FIG. 4 is a cross-sectional view taken on line 4—4 of FIG. 1; and

Figure 5:
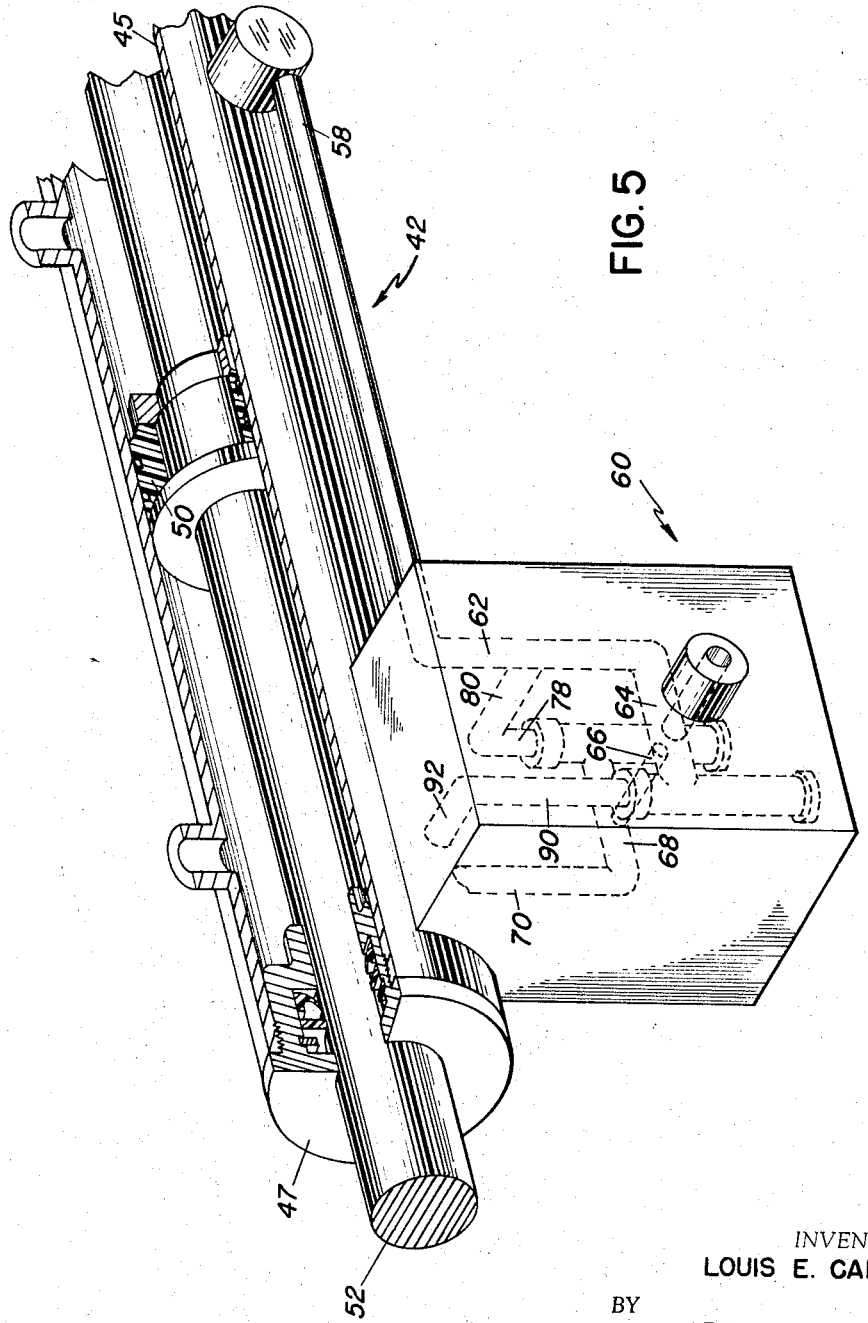
FIG. 5 is an axonometric view of a preferred embodiment of this invention showing the various passageways of the valve block in dotted lines.

Referring now in detail to the embodiment illustrated in the drawings, a damping jack or device, indicated generally at 42, is connected to two elements 44 and 46 to be controlled thereby. This damping cylinder has a cylinder 45 with a suitably packed piston 50 receiprocably retained therein. A rod 52 is secured to the piston 50 and extends through appropriately sealed caps 47 and 48 attached to the ends of the cylinder 45. The rod 52 has a length sufficient to extend completely through the cylinder 45 in all positions of the piston 50, thereby providing equal volume displacements for given movements of the piston in either direction. The rod 52 is attached to one element 46 by means of a universal connector 54 and the cylinder 45 is connected to the other element 44 by means of another universal connection 56. Such a mounting permits the device 42 to maintain proper alignment and to function without binding as the two elements 44 and 46 move relatively to each other.

The piston 50 divides the cylinder 45 into two compartments or chambers A and B, which are connected in fluid communication by means of a conduit 58 and a valve block 60. The chambers A and B and all associated passages and conduits are completely filled with a non-compressible, i.e., virtually incompressible, fluid through filler plugs 61 and 63. For a better understanding of the valve block 60, the various passages contained therein will be referred to by characteristics of their orientation as shown in the drawings, although it is to be understood that their actual orientation in use is not critical. The conduit 58 has one end in direct fluid communication with chamber B and has the other end in direct fluid communication with a vertical passages 62 in valveblock 60. Vertical passage 62 is connected with a horizontal passage 64. A common cross-passage 66 connects horizontal passage 64 with another horizontal passage 68, which connects with a vertical passage 70 terminating in and communicating with the chamber A of the device 42. A seat 72 is formed at the intersection of horizontal passage 64 and cross-passage 66. A needle valve 74 is aligned with this seat 72, and is adjustably mounted in the valve block 60 by means of screw threads 76. The needle valve is positioned relative to the seat so that a slow rate of flow through cross-passage 66 is permitted, which flow may, of course, be in either direction. Horizontal passage 68 is also connected with a vertical passage 78. A one-way ball check valve 82 is positioned within the vertical passage 78 and permits flow only to the horizontal passage 68. This check valve 82 will permit fluid flow in the above-described direction only when the pressure exceeds a predetermined value. As shown here, a spring 84 is provided to force the check valve 82 against its seat 86, and an adjustment means 88, of the type well known in the art, varies the spring force and hence the pressure at which the valve 82 will open. The horizontal passage 64 also communicates with a vertical passage 90, which passage in turn connects with a horizontal passage 92 terminating in and communicating with the chamber A. A second one-way check valve 94 is positioned in the vertical passage 90 and permits fluid flow only from the passage 90 into the horizontal passage 64. Valve 94 is also biased into closed position, as by a spring 96, and is held against its seat 98 until a predetermined pressure is achieved, this pressure being selectively adjustable by adjustment means 100.

As illustrated in FIG. 5, the valve block 60 and its various passages are arranged and designed to allow easy manufacture thereof. Thus, the circuit within the valve block 60 consists essentially of a first conduit means, consisting of vertical passage 62, the right portion of horizontal passage 64, cross-passage 66, the left portion of horizontal passage 68 and vertical passage 70, connecting the two chambers A and B and having a variable restriction 72 and 74 therein. A pair of conduit means is connected with the first conduit means and provide check valves which are oppositely oriented and arranged in parallel with the variable restriction. One of the conduit means comprises horizontal passage 80, vertical passage 78 and the right portion of horizontal passage 68, while the other conduit means comprises the left portion of horizontal passage 64, vertical passage 90, and horizontal passage 92. Although the passage 92, as illustrated, communicates with passage 70 only indirectly through chamber A, it is understood that 92 could, if desired, be arranged to communicate directly with passage 70.

*Operation*

Assume that the elements 44 and 46 move toward each other at a slow rate, i.e., a low velocity of approach. The piston 50 will, therefore, be moved, relative to the cylinder 45, to the right as viewed in FIGS. 1 and 5. The slow rate of movement will create a slight pressure increase in the chamber B. This pressure will be transmitted through the conduit 58 and passages 62, 80 and 78 creating a force tending to unseat the check valve 82. Since the pressure is low, the spring 84 will retain the valve in sealing position against its seat 86, and the only avenue of escape for the fluid is through passages 62 and 64, around the needle valve 74, through cross passage 66, horizontal passage 68, and vertical passage 70 into the chamber A. Fluid flow is not possible from horizontal passage 64 into vertical passage 90 because the check valve 94 will not permit flow in that direction. If the elements 44 and 46 move toward each other at a rapid rate, the movement of the piston 50 relative to the cylinder 45 is relatively fast creating a higher pressure in the chamber B, because the piston is displacing fluid at a rate faster than the needle valve is permitting fluid to flow from one end of the cylinder to the other. When the pressure creates a force sufficient to overcome the spring force, the check valve 82 is unseated and flow of fluid is then through the passages 62, 80, 78, 68 and 70 into the chamber A, thereby permitting the piston to move freely in the cylinder 45.

When the elements 44 and 46 are moved away from each other at a slow rate, i.e., a low velocity of recession, a restricted flow of fluid is permitted through the passages 70, 68, 66, 64 and 62 from chamber A to chamber B. As previously mentioned in connection with movement of the elements toward each other, the slow rate of recession develops a relatively low pressure which is insufficient to unseat the check valve 94. However, when the rate of recession is high, the valve 94 is unseated and free flow of fluid through 92, 90, 64 and 62 results.

It can, therefore, be appreciated that the present invention provides restricted and controlled movement of the elements controlled thereby in both approach and recession whenever the rate of movement is low. It is also apparent that the arrangement of the needle valve permits easy and quick adjustment of the adjustable restriction means with the jack 42 operatively connected to the elements and without requiring disassembly of the device. In addition, it is apparent that the pressure at which free and unrestricted movement begins can be adjusted. Furthermore, the two adjustment means 88 and 100 permit independent adjustment of such pressures and thereby allow the initiation of free movement in extension to differ from that in collapse.

While there is in this application specifically described one form which the invention may assume in practice, it will be understood that this form of the same is shown for purposes of illustration and that the invention may be modified and embodied in various other forms without departing from its spirit or the scope of the appended claims.

What is claimed is:

1. A damping device for controlling the relative approach and recession of two elements, comprising:
   a cylinder secured to one of said elements,
   a rod having a piston extending through the cylinder and secured to the other of said elements,
   means sealing the longitudinal ends of said cylinder for retaining fluid therein,
   a valve block secured to one end of the cylinder,
   a conduit providing fluid communication between said block and the other end of the cylinder,
   a first passageway in said block providing fluid connection between the conduit and said one end,
   flow restriction means in the first passageway for restricting the flow of fluid therethrough in either direction,
   second and third passageways in said block connected in parallel with said restriction means, said second and third passageways in direct fluid communication with said first passageway for receiving flow directly therefrom,
   spring-loaded check valves in each of said second and third passageways arranged to permit fluid flow in opposite directions between the ends of said cylinder, and separate adjustment means associated with said check valves for selectively predetermining the pressure at which said valves open.

2. A damping device according to claim 1 and further comprising another adjustment means associated with said restriction means for varying the resistance to fluid flow therethrough.

References Cited

UNITED STATES PATENTS

| 2,040,262 | 5/1936 | Kruckenberg et al. | 105—174 |
| 2,554,774 | 5/1951 | Buivid | 170—160.55 |
| 2,838,140 | 6/1958 | Rasmusson et al. | 188—97 |

ARTHUR L. LA POINT, *Primary Examiner.*

H. BELTRAN, *Assistant Examiner.*